(12) United States Patent
Kyle

(10) Patent No.: US 10,189,629 B2
(45) Date of Patent: Jan. 29, 2019

(54) PAPER BASED CELLULOSIC DUNNAGE

(71) Applicant: SOBRO PACKAGING LLC, Perry, GA (US)

(72) Inventor: James Kyle, Perry, GA (US)

(73) Assignee: Sobro Packaging LLC, Perry, GA (US)

(*) Notice: Subject to any disclaimer, the term of this patent is extended or adjusted under 35 U.S.C. 154(b) by 158 days.

(21) Appl. No.: 15/439,074

(22) Filed: Feb. 22, 2017

(65) Prior Publication Data
US 2018/0237202 A1 Aug. 23, 2018

(51) Int. Cl.
| B65D 81/107 | (2006.01) |
| B32B 3/12 | (2006.01) |
| B32B 29/00 | (2006.01) |
| B32B 7/12 | (2006.01) |
| B65D 81/02 | (2006.01) |
| B65D 5/50 | (2006.01) |

(52) U.S. Cl.
CPC ........... *B65D 81/107* (2013.01); *B32B 3/12* (2013.01); *B32B 7/12* (2013.01); *B32B 29/005* (2013.01); *B65D 5/5047* (2013.01); *B65D 65/44* (2013.01); *B32B 2553/023* (2013.01)

(58) Field of Classification Search
CPC ........ B65D 81/07; B65D 65/44; B32B 33/12; B32B 7/12; B32B 29/005; B32B 2305/024; B32B 37/146; B29C 66/438; B29C 66/7254; E04C 7/365; E04C 2/36
USPC ............. 229/100, 103.11; 428/116, 118, 73; 410/154, 155; 52/793.1, 794.1, 783.18; 206/814; 156/197; 493/966
See application file for complete search history.

(56) References Cited

U.S. PATENT DOCUMENTS

| 4,685,267 A | 8/1987 | Workman | |
| 5,022,943 A * | 6/1991 | Zaima | B29D 24/005 |
| | | | 156/222 |
| 5,040,696 A * | 8/1991 | Liebel | B65D 5/5028 |
| | | | 206/521 |
| 5,132,156 A * | 7/1992 | Trassare, Jr. | B60P 7/135 |
| | | | 206/593 |
| 5,171,114 A | 12/1992 | Dunn | |
| 5,484,241 A | 1/1996 | Haywood et al. | |
| 5,492,267 A * | 2/1996 | Hollander | B32B 3/12 |
| | | | 229/231 |
| 8,221,869 B2 | 7/2012 | Pare | |
| 2006/0000547 A1 * | 1/2006 | Roberge | B29C 66/83423 |
| | | | 156/292 |

FOREIGN PATENT DOCUMENTS

EP 2733081 A1 5/2014

OTHER PUBLICATIONS

Deslauriers, "Box Voids: Versatile, Economical Means of Forming Concrete", Published Jul. 9, 1905.

* cited by examiner

*Primary Examiner* — Christopher Demeree
(74) *Attorney, Agent, or Firm* — Eversheds Sutherland (US) LLP

(57) ABSTRACT

A paper based cellulosic dunnage for use during transportation of goods. The dunnage may include an inner core, with a plurality of vertically aligned cellulosic cells that may be hexagonal in shape. The dunnage may include a top linerboard, attached to the top surface of the inner core, and corner boards, attached to the top and side surfaces of the inner core.

26 Claims, 3 Drawing Sheets

PAPER BASED CELLULOSIC DUNNAGE

FIELD OF THE DISCLOSURE

The present disclosure relates generally to dunnage, and more particularly, to paper based cellulosic dunnage for supporting and protecting delicate materials during transportation.

BACKGROUND

Various types of dunnage are known in the art, including wood, plastic, paper, foam, matting, and other types of materials that are used to help protect materials during transportation and to prevent them from moving within their shipping containers. Depending on the materials and geometries that are selected, the properties of the dunnage may be more or less desirable for certain applications. Certain materials, such as wooden chocks or pallets, are used to provide fixed spacing or anchoring points without deformation or deflection. Conversely, materials like foam and captured air, are used to provide cushioned impact protection. While these materials may provide increased protection through their inherent ability to absorb impacts and deform, they do not provide the same levels of product motion control offered by more rigid alternatives. They may also suffer from additional disadvantages, wooden dunnage for example, is prohibited in many countries due to the potential for the transportation of invasive insects.

Designing dunnage also involves significant financial considerations. The materials should have low manufacturing costs, as many times, for example, with trans-oceanic shipping, it is best to dispose of the dunnage after receipt as opposed to paying to ship it back. While some shipments may be bi-directional, may specialty product shipments only occur in a single direction, from supplier to consumer, meaning there is very little opportunity for reuse. Similarly, it is important to minimize both weight and volume. Both weight and volume are at a premium in trans-oceanic shipments and as little space should be wasted by shipping materials, as opposed to the goods being transported.

That said, in many instances, protecting goods during shipment can be every bit as important as manufacturing cost, weight, and volume. For very expensive goods, or goods that carry a long manufacturing lead time, the loss or damage of goods during transport is unacceptable. In these instances, financially inefficient dunnage may still make financial sense due to the time and money that can be lost due to damaged goods.

Accordingly, there is a desire for improved dunnage, that is capable of low-cost manufacturing, minimizes space and weight, and maximizes protection available to the materials.

SUMMARY

In one aspect, a paper based shipping dunnage is provided. According to one embodiment, the dunnage may include an inner core that has a top and bottom surface, two side surfaces, and two end surfaces. The inner core may include a plurality of vertically aligned cellulosic cells. The dunnage may also include a top linerboard that is attached to the top surface of the inner core, and two corner boards. The corner boards may be made up of at least four laminated paperboard layers that may be formed into a right angle. Each corner board may contact the top surface of the top linerboard and one of the side surfaces. In one aspect, the top linerboard may be made from a single layer of paperboard.

In another aspect, the plurality of vertically aligned cellulosic cells may be hexagonal in shape and arranged in a honeycomb structure. The corner boards may have an inner vertical surface and an inner horizontal surface, and the inner horizontal surface may be attached to the top surface of the top linerboard. In some aspects, the corner boards may be attached to the top linerboard using adhesive. In one aspect, the top linerboard substantially covers the top surface.

In another aspect, the corner boards may extend longitudinally from one end surface of the inner core to the opposite end surface of the inner core. In one aspect, the dunnage may include a bottom linerboard attached to the bottom surface of the inner core. In some aspects, the bottom linerboard may be made from a single layer of paperboard.

In yet another aspect, the dunnage may also include an affixing element for fixing the dunnage in place. In one aspect, the affixing element may be attached to the bottom surface of the inner core, in some aspects, the affixing element may be two-sided tape.

These and other aspects and improvements of the present disclosure will become apparent to one of ordinary skill in the art upon review of the following detailed description when taken in conjunction with the several drawings and the appended claims.

BRIEF DESCRIPTION OF THE DRAWINGS

The detailed description is set forth with reference to the accompanying drawings illustrating examples of the disclosure, in which use of the same reference numerals indicates similar or identical items. Certain embodiments of the present disclosure may include elements, components, and/or configurations other than those illustrated in the drawings, and some of the elements, components, and/or configurations illustrated in the drawings may not be present in certain embodiments.

DETAILED DESCRIPTION

Exemplary embodiments will now be described more fully hereinafter with reference to the accompanying drawings, in which exemplary embodiments are shown. The concepts disclosed herein may, however, be embodied in many different forms and should not be construed as limited to the exemplary embodiments set forth herein; rather, these embodiments are provided so that this disclosure will be thorough and complete, and will fully convey the scope of the concepts to those skilled in the art. Like numbers refer to like, but not necessarily the same or identical, elements throughout.

The present disclosure includes non-limiting embodiments of dunnage within the scope of the disclosure. The embodiments are described in detail herein to enable one of ordinary skill in the art to practice the disclosure and related methods of use, although it is to be understood that other embodiments may be utilized and that logical changes may be made without departing from the scope of the disclosure.

As used herein, the term "goods" refers to any physical product that may be shipped from one location to another, the term "shipping container" refers to mode of transporting goods and includes, for example, boxes, crates, bins, tubs, drums, tanks, carboys, rolls, pallets, trailers, trucks, rail cars, and oceanic shipping containers. The meanings of other terms used herein will be apparent to one of ordinary skill in the art or will become apparent to one of ordinary skill in the art upon review of the detailed description when taken in conjunction with the several drawings and the appended claims.

Figure 1:
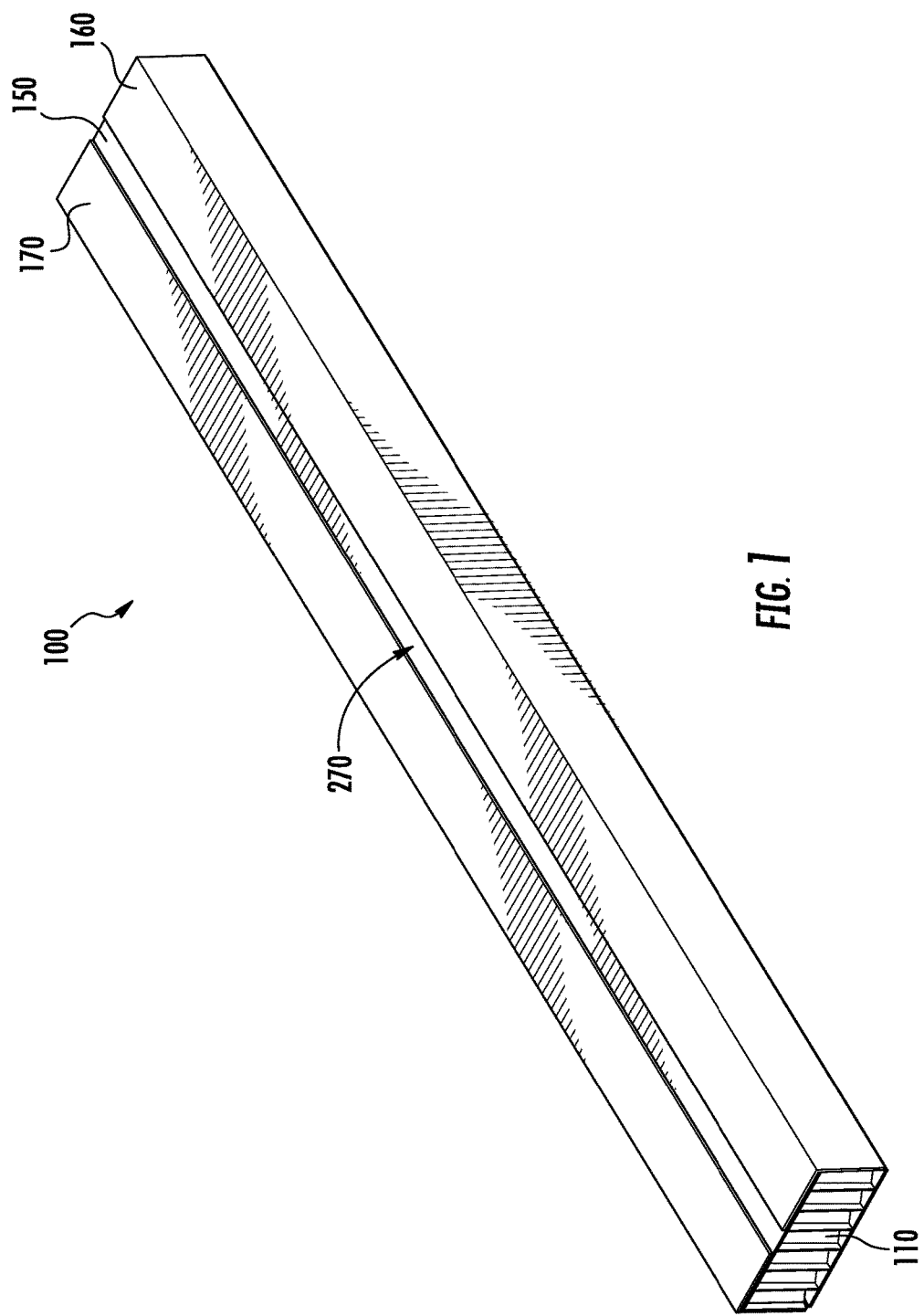
FIG. 1 is a perspective view of a paper based cellulosic dunnage in accordance with one or more embodiments of the disclosure.
Figure 2:
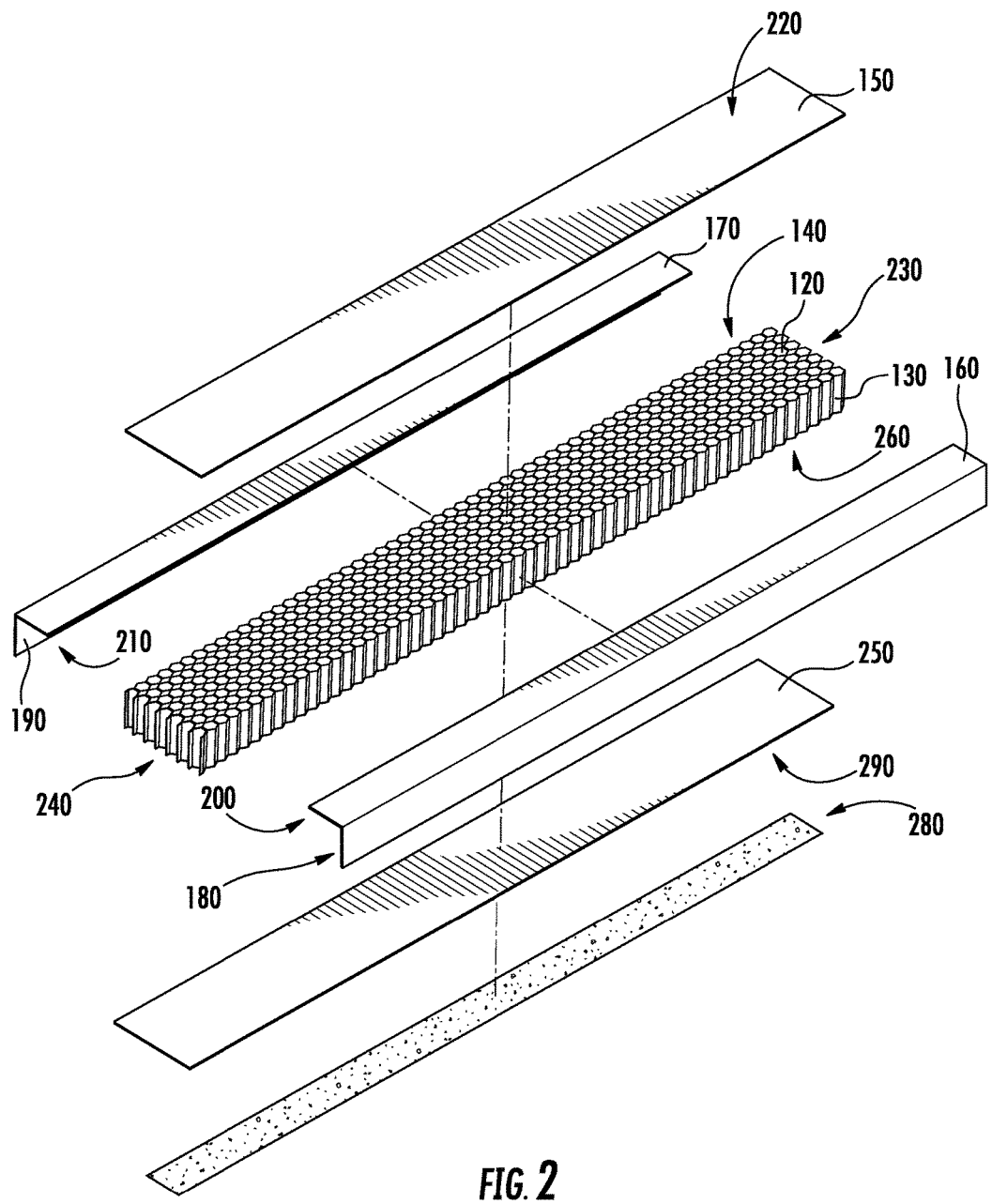
FIG. 2 is an exploded perspective view of the paper based cellulosic dunnage in accordance with one or more embodiments of the disclosure.

FIGS. 1 and 2 depict a paper based cellulosic dunnage 100 (which also may be referred to simply as "dunnage") according to one or more embodiments of the disclosure. The dunnage 100 is configured to support goods during shipment and protect the goods from damage during transportation. As described below, the geometry of the dunnage 100 is adjustable to accommodate different goods and shipping containers, allowing for variation in packing density and shipping container selection.

As shown in FIG. 1, the dunnage 100 may have an inner core 110 with a top plane 120, a first side plane 130, a second side plane 140, and a plurality of vertically aligned cellulosic cells. The dunnage 100 may also include a top linerboard 150 that may be attached to the top plane 120 of the inner core 110. In one exemplary embodiment, the dunnage includes a first corner board 160 and a second corner board 170 that may each comprise at least four laminated paperboard layers. The first corner board 160 and the second corner board 170 may be formed into a right angle. As shown, the first corner board 160 may be disposed adjacent to the top plane 120 of the inner core 110 and the first side plane 130 of the inner core 110, and the second corner board 170 may be disposed adjacent to the top plane 120 of the inner core 110 and the second side plane of the inner core 110.

In one embodiment, the top linerboard 150 comprises a single layer of paperboard. In other exemplary embodiments, the top linerboard 150 may be made from multiple layers of paperboard to change the rigidity or resiliency of the dunnage 100, similarly, other exemplary embodiments may utilize a top linerboard 150 that is porous or has openings to allow for the passage of air and moisture, to help prevent mildew or to allow for the free flow of insecticides, sterilization agents, or other gasses that may be encountered in preparation for, during, or following transportation.

In further detail, FIG. 2 depicts the first corner board 160 and the second corner board 170, each having an inner vertical surface 180 and 190, and an inner horizontal surface 200 and 210. In one exemplary embodiment, the inner horizontal surfaces 200 and 210 of the first corner board 160 and the second corner board 170 may be attached to the top surface 220 of the top linerboard 150. In one exemplary embodiment, the first corner board 160 and the second corner board 170 may be attached to the top linerboard 150 using adhesive. In other exemplary embodiments, the corner boards 160 and 170 may be attached by other means, including, for example, staples, nails, snaps, rivets, or other fasteners, single or two-sided tape, or by folding or interlocking geometries included in the top linerboard 150 and corner boards 160 and 170.

As shown in FIGS. 1 and 2, the top linerboard 150 may substantially cover the entire top plane 120 of the inner core 110. In other exemplary embodiments, as discussed above, the top linerboard 150 may be porous, or only cover a portion of the inner core 110 to allow for the free flow of gas or alter the rigidity or resiliency of the dunnage 100.

Similarly, in one example embodiment, the first corner board 160 and the second corner board 170 may extend longitudinally from a first end plane 230 of the inner core 110 to a second end plane 240 of the inner core 110. Alternatively, in other exemplary embodiments, the first corner board 160 and second corner board 170 may only extend partially over the length of the dunnage 100.

As shown in FIG. 2, in one exemplary embodiment, the dunnage 100 may additionally include a bottom linerboard 250, attached to the bottom plane 260 of the inner core 110. In one example, the bottom linerboard 250 comprises a single layer of paperboard, in other exemplary embodiments, as with the top linerboard 150, the bottom linerboard 250 may have multiple layers, or may be porous or only cover a portion of the bottom plane 260. In another exemplary embodiment, the dunnage 100 may also include a first side linerboard and a second side linerboard, which may be made of a single layer paperboard, or may have multiple layers, or may be porous or only cover a portion of the side planes 130 and 140. The first side linerboard and the second side linerboard may be attached to the inner vertical surfaces 180 and 190 of the first corner board 160 and the second corner board 170.

As shown in FIG. 1, the first corner board 160 and second corner board 170 may be spaced apart such that a channel 270 is left along the top surface of the dunnage 100, exposing the top surface of the top linerboard 150. In one exemplary embodiment, the channel 270 is at least 0.5 inches wide. In other exemplary embodiments, the channel may be wider or narrow to allow for the passage of air and moisture, to help prevent mildew or to allow for the free flow of insecticides, sterilization agents, or other gasses that may be encountered in preparation for, during, or following transportation. In one exemplary embodiment, the dunnage 100 is at least 2.5 inches in height. In other exemplary embodiments, different heights may be used to impact the rigidity and resiliency of the dunnage 100 and to accommodate the various geometries of the goods and shipping containers, including any tie-downs or other variations in the surface of the shipping containers.

In yet another exemplary embodiment, the dunnage may additionally include a fixing element for fixing the dunnage 100 in place. In one exemplary embodiment, a two-sided piece of tape 280 is attached to the bottom plane 260 of the inner core 110. In another exemplary embodiment, a two-sided piece of tape is attached to the bottom plane 290 of the bottom linerboard 250.

Figure 3:
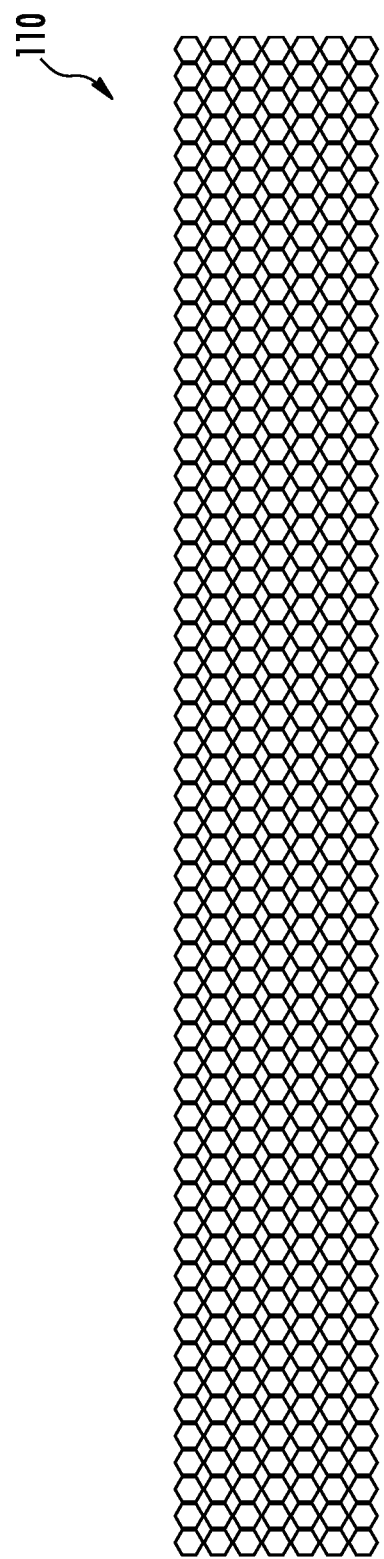
FIG. 3 is a plan view of the inner core of the dunnage in accordance with one or more embodiments of the disclosure.

FIG. 3, depicts the inner core 110. In one exemplary embodiment, the vertically aligned cells of the inner core 110 may be hexagonal in shape and arranged in a honeycomb structure as shown. The hexagonal cells extend from the top plane 120 to the bottom plane 260, and may be intersected and partially divided by the side planes 130 and 140, and end planes 230 and 240, of the inner core 110. In other exemplary embodiments, the vertically aligned cells of the inner core 110 may be circular or rectangular or other shapes as may be dictated by the manufacturing methods or materials.

Although certain embodiments of the disclosure are described herein and shown in the accompanying drawings, one of ordinary skill in the art will recognize that numerous modifications and alternative embodiments are within the scope of the disclosure. Moreover, although certain embodiments of the disclosure are described herein with respect to specific dunnage configurations, it will be appreciated that numerous other dunnage configurations are within the scope of the disclosure. Conditional language used herein, such as "can," "could," "might," or "may," unless specifically stated otherwise, or otherwise understood within the context as used, generally is intended to convey that certain embodiments include, while other embodiments do not include, certain features, elements, or functional capabilities. Thus, such conditional language generally is not intended to imply that certain features, elements, or functional capabilities are in any way required for all embodiments.

I claim:

1. A paper based shipping dunnage, the dunnage comprising
an inner core comprising a top plane, a first side plane, a second side plane, and a plurality of vertically aligned cellulosic cells;
a top linerboard attached to the top plane of the inner core; and
a first corner board and a second corner board; wherein the first corner board and the second corner board each comprise at least four laminated paperboard layers that are formed into a right angle, the first corner board being disposed adjacent to the top plane and first side plane of the inner core, the second corner board being disposed adjacent to the top plane and the second side plane of the inner core;
wherein the first corner board and second corner board each further comprise an inner vertical surface and an inner horizontal surface, and wherein the inner horizontal surfaces of the first corner board and second corner board are attached to a top surface of the top linerboard.

2. The dunnage of claim 1 wherein the top linerboard comprises a single layer paperboard.

3. The dunnage of claim 1 wherein the plurality of vertically aligned cellulosic cells are hexagonal and arranged in a honeycomb structure.

4. The dunnage of claim 1 wherein the first corner board and the second corner board are attached to the top linerboard using adhesive.

5. The dunnage of claim 1 wherein the top linerboard substantially covers the entire top plane.

6. The dunnage of claim 5 wherein the first corner board and the second corner board extend longitudinally from the first end plane to the second end plane.

7. The dunnage of claim 1 wherein the inner core further comprises a first end plane and a second end plane.

8. The dunnage of claim 1 wherein the inner core further comprises a bottom plane.

9. The dunnage of claim 8 wherein the dunnage further comprises a bottom linerboard attached to the bottom plane of the inner core.

10. The dunnage of claim 9 wherein the bottom linerboard comprises a single layer paperboard.

11. The dunnage of claim 1 wherein the dunnage further comprises a first side linerboard and a second side linerboard, the first side linerboard attached to the first side plane, the second side linerboard attached to the second side plane.

12. The dunnage of claim 11 wherein the first side linerboard and the second side linerboard both comprise a single layer paperboard.

13. The dunnage of claim 11 wherein the inner vertical surface of the first corner board and the second corner board are attached to the first side linerboard and the second side linerboard respectively.

14. The dunnage of claim 1 further comprising an affixing element for fixing the dunnage in place.

15. The dunnage of claim 14 wherein the affixing element is attached to the bottom plane of the inner core.

16. The dunnage of claim 14 wherein the affixing element is two-sided tape.

17. A paper based shipping dunnage, the dunnage comprising
an inner core comprising a top plane, a first side plane, a second side plane, and a plurality of vertically aligned cellulosic cells;
a top linerboard attached to the top plane of the inner core; and
a first corner board and a second corner board; wherein the first corner board and the second corner board each comprise at least four laminated paperboard layers that are formed into a right angle, the first corner board being disposed adjacent to the top plane and first side plane of the inner core, the second corner board being disposed adjacent to the top plane and the second side plane of the inner core, wherein the first corner board and second corner board are spaced apart such that a channel is left along the top surface of the dunnage, exposing the top surface of the top linerboard.

18. The dunnage of claim 17 wherein the channel is at least 0.5 inches wide.

19. The dunnage of claim 18 wherein the dunnage is at least 2.5 inches in height.

20. The dunnage of claim 17 further comprising an affixing element for fixing the dunnage in place.

21. The dunnage of claim 20 wherein the affixing element is attached to the bottom plane of the inner core.

22. The dunnage of claim 20 wherein the affixing element is two-sided tape.

23. The dunnage of claim 17 wherein the plurality of vertically aligned cellulosic cells are hexagonal and arranged in a honeycomb structure.

24. The dunnage of claim 17 wherein the dunnage further comprises a first side linerboard and a second side linerboard, the first side linerboard attached to the first side plane, the second side linerboard attached to the second side plane.

25. The dunnage of claim 24, wherein the first corner board and second corner board each further comprise an inner vertical surface and an inner horizontal surface, and wherein the inner horizontal surfaces of the first corner board and second corner board are attached to a top surface of the top linerboard.

26. The dunnage of claim 25 wherein the inner vertical surface of the first corner board and the second corner board are attached to the first side linerboard and the second side linerboard respectively.

* * * * *